United States Patent [19]

VanWert et al.

[11] Patent Number: 5,082,894
[45] Date of Patent: Jan. 21, 1992

[54] STORAGE STABLE ONE-PART ORGANOSILOXANE COMPOSITIONS

[75] Inventors: Bernard VanWert, Midland, Mich.; Dawn M. Houghtaling, Randolph, N.J.

[73] Assignee: Dow Corning Corporation, Midland, Mich.

[21] Appl. No.: 495,823

[22] Filed: Mar. 19, 1990

[51] Int. Cl.$^5$ .............................................. C08K 5/54
[52] U.S. Cl. ................................... 524/730; 524/265; 524/267; 524/731; 528/15; 525/478
[58] Field of Search .......................... 528/15; 525/478; 524/265, 267, 730, 731

[56] References Cited

U.S. PATENT DOCUMENTS

| | | | |
|---|---|---|---|
| 3,188,299 | 6/1965 | Chalk | 260/46.5 |
| 3,188,300 | 6/1965 | Chalk | 260/46.5 |
| 3,192,181 | 6/1965 | Moore | 260/46.5 |
| 3,344,111 | 9/1967 | Chalk | 260/46.5 |
| 3,383,356 | 5/1968 | Nielsen | 260/46.5 |
| 3,445,420 | 5/1969 | Kookootsedes | 260/37 |
| 3,772,066 | 11/1973 | Clark et al. | 117/132 |
| 3,989,666 | 11/1976 | Niemi | 260/46.5 |
| 4,033,924 | 7/1977 | Mine et al. | 260/37 |
| 4,082,726 | 4/1978 | Mine et al. | 260/46.5 |
| 4,087,585 | 5/1978 | Schulz | 428/429 |
| 4,157,357 | 6/1979 | Mine et al. | 260/825 |
| 4,245,079 | 1/1981 | Matsumoto | 528/15 |
| 4,256,870 | 3/1981 | Eckberg | 528/15 |
| 4,311,739 | 1/1982 | Hardman et al. | 427/387 |
| 4,336,364 | 6/1982 | Maxson | 528/15 |
| 4,337,332 | 6/1982 | Melancon et al. | 528/15 |
| 4,347,346 | 8/1982 | Eckberg | 528/15 |
| 4,460,739 | 7/1984 | Ashby | 524/702 |
| 4,810,768 | 3/1989 | Wong | 528/32 |

*Primary Examiner*—Melvyn I. Marquis
*Attorney, Agent, or Firm*—Robert Spector

[57] ABSTRACT

The combination of (1) long term storage stability, (2) a relative short cure time at temperatures below about 150° C. and (3) cohesive bonding of the cured elastomer to a variety of substrates is achieved in a one-part organosiloxane composition that cures by a platinum-catalyzed hydrosilylation when the composition includes an acetylenic alcohol containing at least eight carbon atoms as the catalyst inhibitor and, as the adhesion promoter, an alkoxysilane containing an epoxy group and a polyorganosiloxane containing an average of at least one silicon-bonded hydroxyl group and at least one silicon-bonded vinyl radical per molecule. The concentrations of catalyst and adhesion promoter are within specified limits.

4 Claims, No Drawings

STORAGE STABLE ONE-PART ORGANOSILOXANE COMPOSITIONS

BACKGROUND OF THE INVENTION

1. Field of the Invention

This invention relates to organosiloxane compositions that cure by a platinum-catalyzed hydrosilylation reaction. More particularly, this invention relates to one-part organosiloxane compositions of this type that can be stored for extended periods of time at a temperature of about 25° C. yet cure rapidly at temperatures above about 80° C.

2. Description of the Prior Art

Organosiloxane compositions that cure by a hydrosilylation reaction between alkenyl radicals and silicon-bonded hydrogen atoms are well known. Hydrosilylation reactions are typically catalyzed by metals from the platinum group of the periodic table of the elements or compounds of these metals. A desirable feature of these compositions is their rapid cure rate, particularly at temperatures above about 50° C. Curing of the composition begins even at temperatures of 25° C. or below once the organosilicon compound containing the alkenyl hydrocarbon radicals is combined with the organohydrogensiloxane in the presence of the catalyst. Compositions of this type therefore cannot generally be stored for extended periods of time prior to use.

The chemical and patent literature disclose a variety of compounds and reaction products that will retard or inhibit curing of compositions by platinum-catalyzed hydrosilylation reactions for varying periods of time under ambient conditions. These catalyst inhibitors fall into two general classes.

One class of inhibitors is composed of materials that effectively inhibit a hydrosilylation reaction over a relatively wide temperature range and can be volatilized out of the composition when it is desired to cure the composition. Examples of this class of inhibitor include but are not limited to pyridine (U.S. Pat. No. 3,188,299), acrylonitrile (U.S. Pat. No. 3,344,111), acetylenic compounds (U.S. Pat. No. 3,445,420) and perchloroethylene (U.S. Pat. No. 3,383,356).

The second class of inhibitors are non-volatile at temperatures conventionally used to cure the compositions. The inhibitory effect of these materials is overcome by heating to the desired curing temperature. Examples of this type of inhibitor include reaction products of an organohydrogensiloxane, the platinum-containing hydrosilylation catalyst and an acetylenic alcohol (U.S. Pat. Nos. 3,989,666 and 4,336,364), organic phosphines and phosphites (U.S. Pat. No. 3,188,300), benzotriazole (U.S. Pat. No. 3,192,181), dialkyl carboxylic esters (U.S. Pat. Nos. 4,256,870 and 4,347,346) and unsaturated amides (U.S. Pat. No. 4,337,332).

The acetylenic compounds disclosed in the aforementioned U.S. Pat. No. 3,445,420 preferably boil at temperatures between about 25° and 250° C. under atmospheric pressure. This class of compounds includes hydrocarbons, alcohols, ketones and heterocyclic compounds containing at least one carbon-to-carbon triple bond per molecule. Preferred inhibitors are secondary or tertiary acetylenic alcohols and are present at a concentration of at least 0.1 weight percent, based on the weight of the curable composition.

A disadvantage of many organosiloxane materials prepared by curing compositions using a platinum-catalyzed hydrosilylation reaction is the relatively poor adhesion of these materials to inorganic substrates, particularly metals and organic polymers. As in the case of hydrosilylation catalyst inhibitors, the prior art describes a wide variety of compounds that can be incorporated as adhesion promoters into the curable organosiloxane composition.

For example, U.S. Pat. No. 4,460,739, which issued to Ashby on July 17, 1984, discloses using maleamidyl substituted trialkoxy- or triacyloxysilanes for this purpose.

The use of partial hydrolysis products of aliphatically unsaturated alkoxysilanes, such as vinyltrialkoxysilanes, as adhesion promoters for compositions comprising a vinyl terminated polyorganosiloxane, an organohydrogensiloxane crosslinking agent and a platinum catalyst is taught in U.S. Pat. No. 4,311,739, which issued to Hardman and Dujak on Jan. 19, 1982.

A number of patents teach imparting adhesion to polyorganosiloxane compositions that are curable to silicone elastomers using a platinum-catalyzed hydrosilylation reaction by incorporating organosilicon compounds containing various silicon-bonded reactive groups such as ester, epoxy or trialkoxysilylalkyl group into the ethylenically unsaturated polyorganosiloxane reactant. U.S. Pat. No. 4,245,079, which issued to Matsumoto and Murai on Jan. 13, 1981 teaches that when the reactive group is trialkoxysilylalkyl, the ethylenically unsaturated polyorganosiloxane reactant exhibits repeating units of the general formula $-OSi(CH_3)[RSi(OR')_3]$, where R is alkylene and R' is alkyl.

U.S. Pat. No. 4,033,924, which issued on July 5, 1977 and U.S. Pat. No. 4,082,726, which issued on Apr. 4, 1978 disclose adhesion-promoting additives that are organosilicon compounds containing an epoxy group and at least one low molecular weight alkenyl radical or silicon-bonded hydrogen atom.

Organosilicon compounds containing at least two silicon bonded hydrogen atoms per molecule and an average of at least one unit of the formula $(RO)_3Si(CH_2)_x(CH_3)SiO$ and/or $(RO)_3Si(CH_2)_x(CH_3)_2SiO_{\frac{1}{2}}$ where R represents methyl, ethyl or $CH_3C(O)-$ and x is 2 or 3 are taught in U.S. Pat. No. 3,772,066, which issued to Clark and Hays on Nov. 13, 1973. In addition to functioning as curing agents these organosilicon compounds also improve the adhesion of the cured compositions.

Incorporation of epoxy groups together with alkenyl radicals into the organosilicon compound that reacts with silicon bonded hydrogen atoms to form a cured product is taught in U.S. Pat. No. 4,157,357, which issued to Mine and Yokoyama on June 5, 1979.

The prior art also teaches using mixtures of two or more organosilicon compounds to achieve cohesive bonding between silicone elastomers cured by a hydrosilylation reaction and various substrates while extending the working time of the corresponding curable compositions. The combination of (1) a polyorganosiloxane containing a hydroxy group and a vinyl radical and (2) an epoxy-functional silane is taught in U.S. Pat. No. 4,087,585 that issued to Schulz on May 2, 1978. This patent also discloses the necessity of heating curable compositions containing this adhesion promoter to temperatures of at least 100° C. to overcome the inhibiting effect of the adhesion promoter on the platinum-catalyzed curing reaction.

U.S. Pat. No. 4,810,763, which issued on July 3, 1989 teaches adding a carboxylic acid to extend the working time of organosiloxane compositions containing an amino-substituted organosilicon compound as an adhesion promoter.

SUMMARY OF THE INVENTION

The combination of (1) long term storage stability, (2) a relative short cure time at temperatures below about 150° C. and (3) cohesive bonding of the cured elastomer to a variety of substrates is achieved in a one-part organosiloxane composition that cures by a platinum-catalyzed hydrosilylation when the composition includes an acetylenic alcohol containing at least eight carbon atoms as the catalyst inhibitor and, as the adhesion promoter, an alkoxysilane containing an epoxy group and a polyorganosiloxane containing an average of at least one silicon-bonded hydroxyl group and at least one silicon-bonded vinyl radical per molecule. The concentrations of catalyst and adhesion promoter are within specified limits.

DETAILED DESCRIPTION OF THE INVENTION

This invention provides an improved one-part liquid organosiloxane composition curable by a platinum-catalyzed hydrosilylation reaction, the composition comprising A. at least one liquid polydiorganosiloxane containing an average of at least two alkenyl radicals per molecule, B. an organohydrogensiloxane containing an average of at least three silicon-bonded hydrogen atoms per molecule in an amount sufficient to cure said composition to an elastomer, C. an amount of a platinum-containing hydrosilylation catalyst sufficient to promote curing of said composition at a temperature of at least 80° C., D. as the catalyst inhibitor, an acetylenic alcohol in an amount sufficient to suppress the activity of said catalyst at temperatures below about 40° C., and E. as an adhesion promoter, an amount of at least one functionally substituted silane sufficient to achieve cohesive bonding between an elastomer prepared by curing said composition and an inorganic substrate.

The improvement consists essentially of the presence in said composition of (1) an acetylenic alcohol containing at least 8 carbon atoms in an amount that imparts long term storage stability to the curable composition yet does not inhibit curing of said composition at temperatures below about 150 degrees, and (2) as said adhesion promoter, a mixture consisting essentially of (a) a polysiloxane containing at least one silicon-bonded vinyl radical and at least one silicon-bonded hydroxyl radical per molecule, and (b) an epoxy-substituted alkoxysilane, where the concentration of said adhesion promoter is from 0.5 to 5 percent by weight, based on the weight of said polydiorganosiloane, and the weight ratio of said alkoxysilane several hours at 100° C. to less than 1 hour at 150° C. or above" to obtain a cured material.

The present invention is based on the discovery that when curable organosiloxane compositions contain from 0.5 to about 5 weight percent, based on the weight of the ingredient A, of the adhesion promoters described in the aforementioned Schulz patent and from about 0.1 to about 1 weight percent of an acetylenic alcohol containing at least eight carbon atoms, the compositions are stable for from three to six months at temperatures of about 25° C. in a closed container yet cure in 15 minutes or less at temperatures of from about 80° to about 150° C. This combination of long-term storage stability and rapid curing at relative low temperatures is unexpected and contrary to the teaching of the Schulz patent.

THE VINYL-CONTAINING DIORGANOPOLYSILOXANE (INGREDIENT A)

The diorganopolysiloxane ingredient of the present compositions can be represented by the general formula I

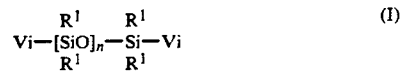

where each $R^1$ is individually selected from monovalent hydrocarbon radicals and monovalent halohydrocarbon radicals, Vi represents a vinyl radical, and n represents a degree of polymerization equivalent to a viscosity of from 1 to about 200 Pa·s at 25° C.

The two $R^1$ substituents on each silicon atom can be identical or different, and can contain from 1 to about 20 carbon atoms. A range of from 1 to 10 carbon atoms is preferred based on the availability of the corresponding monomers. Most preferably at least 50 percent of hydrocarbon radicals represented by $R^1$ are methyl, and any remainder are vinyl, phenyl and/or 3,3,3-trifluoropropyl, this preference being based on the availability of the reactants typically used to prepare the polydiorganosiloxane and the properties of cured elastomers prepared from these polydiorganosiloxanes.

Representative embodiments of ingredient A containing vinyl radicals only at the terminal positions include but are not limited to dimethylvinylsiloxy-terminated polydimethylsiloxanes, dimethylvinylsiloxy-terminated-polymethyl-3,3,3-trifluoropropylsiloxanes, dimethylvinylsiloxy-terminated-dimethylsiloxane/3,3,3-trifluoropropylmethylsiloxane copolymers and dimethylvinylsiloxy-terminated-dimethylsiloxane/methylphenylsiloxane copolymers.

The present compositions can contain a single polydiorganosiloxane as ingredient A. Alternatively two or more polydiorganosiloxanes of different molecular weights can be present. The physical properties of the cured elastomer, particularly resiliency and tear strength, are improved by using a combination of high and low molecular weight diorganopolysiloxanes. The low molecular weight species can exhibit a viscosity of from about 0.1 to about 3 Pa·s at 25° C. and the high molecular weight species can exhibit a viscosity of from 20 to about 40 Pa·s at 25° C.

Methods for preparing the liquid polydiorganosiloxanes used as ingredient of the present compositions by hydrolysis and condensation of the corresponding halosilanes or cyclic polydiorganosiloxanes are sufficiently disclosed in the patent and other literature that a detailed description in this specification is not necessary.

THE ORGANOHYDROGENSILOXANE CURING AGENT (INGREDIENT B)

The organosiloxane compositions of this invention are cured by a platinum catalyzed hydrosilylation reaction. The curing agent is an organohydrogensiloxane containing an average of more than two silicon bonded hydrogen atoms per molecule. This ingredient contains from as few as four silicon atoms per molecule up to an average of 20 or more, and can have a viscosity of up to 10 Pa·s or higher at 25° C. The repeating units of ingredient B include but are not limited to $HSiO_{1.5}$, $R^4HSiO$ and/or $R^4_2HSiO_{0.5}$ in addition to one or more of monoorganosiloxy, diorganosiloxane, triorganosiloxy and $SiO_{4/2}$ units. In these formulae $R^4$ represents a monovalent hydrocarbon or halohydrocarbon radical as defined hereinabove for the $R^1$ radical of ingredient A, with the proviso that $R^4$ cannot represent an ethylenically unsaturated hydrocarbon radical.

Alternatively the organohydrogensiloxane can be a cyclic compound containing diorganosiloxane and organohydrogensiloxane units or a compound of the formula $Si(OSiR^4_2H)_4$.

For those most preferred embodiments of the present composition wherein the hydrocarbon radicals of ingredient A represented by $R^1$, $R^2$ and $R^3$ are methyl, $R^4$ of ingredient B is methyl and the curing agent is a linear trimethylsiloxy terminated methylhydrogensiloxane homopolymer or a trimethylsiloxy terminated dimethylsiloxane/methylhydrogensiloxane copolymer. The copolymer contains an average of from 10 to about 50 repeating units per molecule, of which from 3 to 5 are methylhydrogensiloxane.

The molar ratio of silicon bonded hydrogen atoms to vinyl or other ethylenically unsaturated hydrocarbon radicals in compositions curable by a hydrosilylation reaction is critical with respect to the mechanical properties of the cured elastomer. The optimum ratio for the present curable compositions will be determined at least in part by the molecular weight of the polydiorganosiloxane(s) present as ingredient A. This optimum value can readily be determined by those skilled in the art with a minimum of experimentation, and is not part of this invention.

For preferred compositions of this invention the molar ratio of silicon bonded hydrogen atoms to vinyl and/or other ethylenically unsaturated hydrocarbon radicals present in the curable composition is between 1.5 and 3.0.

THE PLATINUM HYDROSILATION CATALYST (INGREDIENT C)

Hydrosilation reactions are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70° C.

Ingredient C can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

THE POLYSILOXANE CONTAINING VINYL AND HYDROXYL GROUPS (INGREDIENT D)

Ingredient D of the present compositions is a polysiloxane containing an average of fewer than 15 silicon atoms per molecule and at least one each of a silicon-bonded hydroxyl group and a silicon-bonded vinyl radical. The remaining valences of the silicon atoms in ingredient D are satisfied by alkyl radicals containing no more than six carbon atoms, phenyl radicals and oxygen atoms connecting adjacent silicon atoms. The siloxane units present in ingredient D can include $R'SiO_{1.5}$, $R'_2SiO$, $R'_3SiO_{0.5}$, $CH_2=CHSiO_{1.5}$, $C_6H_5SiO_{1.5}$, $HOSiO_{1.5}$, $R'(CH_2=CH)SiO$, $R'(OH)SiO$, $HOR'_2SiO_{0.5}$, $HO(C_6H_5)SiO$ and $(HO)(C_6H_5)R'SiO_{1.5}$, where R' represents an alkyl radical containing up to six carbon atoms. Preferably ingredient D is a polydiorganosiloxane containing hydroxyl groups only on the terminal units and the diorganosiloxane units are methylvinylsiloxane or a mixture of dimethylsiloxane and methylvinylsiloxane.

THE EPOXY-SUBSTITUTED ALKOXYSILANE (INGREDIENT E)

This silicon atom of this silane is bonded to at least one epoxy-substituted organic group and at least one alkoxy group, with any remaining valences being satisfied by monovalent hydrocarbon radicals or fluorinated alkyl radicals. The alkoxy groups contain fewer than 7 carbon atoms, and are represented by methoxy ethoxy, propoxy, and butoxy. The monovalent hydrocarbon radicals and fluoroalkyl radicals also contain fewer than 7 carbon atoms. The term "epoxy group" refers to the structure

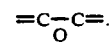

Numerous silanes of this type are described in U.S. Pat. No. 3,455,877, which is incorporated herein by reference thereto as a disclosure of epoxy-substituted alkoxysilanes that are suitable for inclusion in the present compositions.

Ingredient E is preferably a mono(epoxyorgano)trialkoxysilane wherein the epoxyorgano group is selected from the group consisting of

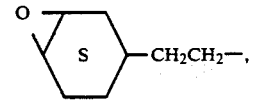

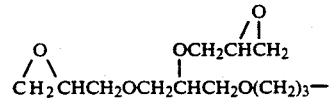

and

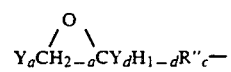

in which each Y represents an alkyl radical containing one or two carbon atoms, a is 0, 1, or 2, c and d are each 0 or 1 and R'' represents a divalent hydrocarbon radical containing no more than 12 carbon atoms, and is either a divalent saturated aliphatic hydrocarbon radical or an arylene radical, or a divalent radical of the formula —R'''(OR''')$_b$OR''', wherein any two oxygen atoms are separated by at least two carbon atoms, R''' is a divalent saturated aliphatic hydrocarbon radical containing from 2 to 6 carbon atoms and the value of b is from 0 to 8, inclusive. Most preferably ingredient E is a 3-glycidoxypropyltrialkoxysilane where the alkoxy group is methoxy or ethoxy.

The weight ratio of ingredient E to ingredient D is preferably within the range of from 0.5 to 5 parts by weight of E per one part by weight of D. This range of weight ratios will provide adhesion to compositions that contain from 0.1 to about 2 weight percent of a mixture of D and E, based on the weight of ingredient A without adversely affecting either the long term storage stability of the composition or the ability of the composition to cure at rapidly (in about 15 minutes or less) at temperatures of from about 100° to 150° C. The combined concentrations of ingredients A and B preferably constitute from 1 to 3 weight percent, based on the weight of ingredient A.

OPTIONAL INGREDIENTS

The Silica Filler

To achieve high levels of tear strength and other physical properties that characterize some types of cured elastomers that can be prepared using the compositions of this invention, it may be desirable to include a reinforcing silica filler. This filler is usually treated with any of the known silica treating agents to prevent a phenomenon referred to as "creping" or "crepe hardening" during processing of the curable composition.

Any finely divided form of silica can be used as the reinforcing filler. Colloidal silicas are preferred because of their relatively high surface area, which is typically at least 50 square meters per gram. Fillers having surface areas of at least 300 square meters per gram are preferred for use in the present method. Colloidal silicas can be prepared by precipitation or a fume process. Both of these preferred types of silica are commercially available.

The amount of finely divided silica used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

The silica treating agent can be any of the low molecular weight organosilicon compounds disclosed in the art as being suitable for preventing creping of organosiloxane compositions during processing. The treating agents are typically liquid hydroxyl terminated polydiorganosiloxanes containing an average of from 2 to about 20 repeating units per molecule, and organosilicon compounds such as hexaorganodisiloxanes and hexaorganodisilazanes that hydrolyze under the conditions used to treat the silica to form compounds with silicon-bonded hydroxyl groups. Preferably at least a portion of the silicon bonded hydrocarbon radicals present on the treating agent are identical to a majority of the hydrocarbon radicals present in ingredients A and B. A small amount of water can be added together with the silica treating agent(s) as a processing aid.

It is believed that the treating agents function by reacting with silicon-bonded hydroxyl groups present on the surface of the silica particles to reduce interaction between these particles.

When a silica filler is present, it is preferably treated in the presence of at least a portion of the other ingredients of the present compositions by blending these ingredients together until the filler is completely treated and uniformly dispersed to form a homogeneous material.

The ingredients that are present during treatment of the silica typically include the silica treating agents and at least a portion of the diorganopolysiloxane(s) referred to herein as ingredient A.

In addition to the vinyl-containing polydiorganosiloxanes, curing agent, platinum-containing catalyst, and optional reinforcing silica filler the organosiloxane compositions of this invention can contain one or more additives that are conventionally present in curable compositions of this type. These materials are added to impart or enhance certain properties of the cured elastomer or facilitate processing of the curable composition.

Typical additives include but are not limited to pigments, dyes, adhesion promoters, flame retardants, heat and/or ultraviolet light stabilizers and resinous organosiloxane copolymers to enhance the physical properties of the cured elastomer.

A preferred type of resinous copolymer contains repeating units of the general formula $SiO_{4/2}$ in addition to triorganosiloxy units of the general formulae $R^5_3SiO_{\frac{1}{2}}$ and diorganovinylsiloxy units of the general formula $CH_2=CH(R^6)_2SiO_{\frac{1}{2}}$. In these formulae $R^5$ and $R^6$ are individually monovalent hydrocarbon or substituted monovalent hydrocarbon radicals as previously defined for the $R^1$ radicals of ingredient A.

The molar ratio of the combination of triorganosiloxy units and diorganovinylsiloxy units to $SiO_{4/2}$ units in the resinous copolymer is from 0.7 to 1.2, inclusive. The vinylcontaining units constitute from 2 to 8 percent by weight of the copolymer, which preferably contains at least two vinyl radicals per molecule. In preferred embodiments of the copolymer the ranges for the molar ratio of diorganovinylsiloxy:triorganosiloxy:$SiO_{4/2}$ units is 0.08–0.1:0.06–1:1.

The resinous copolymers can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxane capping agent than the concentration range taught by Daudt et al.

Briefly, the method of Daudt et al. comprises reacting a silica hydrosol under acidic conditions with the appropriate amount of hexamethyldisiloxane or trimethylchlorosilane. The resinous copolymers used to prepare the present elastomers can be obtained by reacting Daudt et al's. product with the required amount of a hexaorganodisilazane or a hexaorganodisiloxane wherein each silicon atom contains a vinyl radical and two methyl or other hydrocarbon radicals represented by $R^1$ and $R^2$ in the foregoing formula.

PREPARATION OF CURABLE COMPOSITIONS

The one-part compositions of this invention can be prepared by combining all of ingredients at ambient temperature. Any of the mixing techniques and devices described in the prior art can be used for this purpose. The particular device used will be determined by the viscosity of the ingredients and the final curable composition. Cooling of the ingredients during mixing may be desirable to avoid premature curing.

To maximize storage stability the curable compositions are preferably kept in closed containers until used.

Depending upon the types and concentrations of ingredients A and B, cured organosiloxane materials prepared using the present compositions can vary in properties from brittle resins to elastomers, and are useful in a variety of end-use applications as coatings or as molded or extruded articles. Unfilled materials are particularly useful as protective coatings, encapsulants and potting compositions for protecting delicate electronic devices such as transistors and integrated circuits from damage by moisture and other materials present in the environment that can adversely affect operation of the device. The compositions can be used to coat either the individual devices or a circuit board containing a number of these devices together with other electronic components.

Depending upon their viscosity the compositions can be applied to substrates by spraying, dipping or by the use of a brush, roller or coating bar. If required the viscosity of the compositions can be reduced using suitable organic solvents or reactive diluents.

EXAMPLES

The following example describes preferred one-part curable compositions of the present invention and should not be interpreted as limiting the scope of the invention defined in the accompanying claims. Unless otherwise specified all parts and percentages in the example are by weight and viscosities were measured at 25° C.

One part curable compositions were prepared by blending the following ingredients to homogeneity:

92 parts of a dimethylvinylsiloxy-terminated polydimethylsiloxane having a viscosity of 0.4 Pa·s, 6 parts of a trimethylsiloxy-terminated polydiorganosiloxane having an average of five methylhydrogensiloxane units and three dimethylsiloxane units per molecule and containing from 0.7 to 0.8 weight percent of silicon-bonded hydrogen atoms, 0.3 or 0.2 part of a reaction product (ingredient C) of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent, as the adhesion promoter, 1.0, 1.2 or 1.5 part of a 1:1 weight ratio mixture of a hydroxyl terminated polymethylvinylsiloxane having about 4 weight percent of hydroxyl groups (ingredient D) and gamma-glycidoxypropyltrimethoxysilane (ingredient E), and as the platinum catalyst inhibitor (ingredient F) 0.2, 0.5 or 1.0 part of 3,5-dimethyl-1-hexyn-3-ol, an inhibitor of the present invention.

The viscosity of each composition was measured and the values are recorded in Table 1.

The storage stability of each composition was determined by storing the compositions in a closed container under ambient conditions. Each of the compositions was examining it at weekly intervals during the first two months and at monthly intervals thereafter to determine whether the curing had occurred, as evidenced by an increase in the viscosity of the composition.

The cure times of these compositions at temperatures above 100° C. were determined by applying a 0.003 inch-thick coating of each composition to be evaluated on to an FR-4 type of printed circuit board containing a number of electronic components soldered to the board. The coatings were cured by placing the coated substrate in an oven using the temperatures and time periods listed in the following Table 1. The coatings were considered cured when they were dry to the touch.

The presence or absence of adhesion of the cured coatings to the substrate was determined by inscribing a crosshatch pattern of lines spaced about 0.125 inch apart into the coating using a blade and then attempting to peel the coating from the substrate using an adhesive coated tape applied to the surface of the coating.

TABLE 1

| Ingredient | Sample 1 | Sample 2 | Sample 3 |
| --- | --- | --- | --- |
| C | 0.3 | 0.3 | 0.2 |
| D/E Mixture | 1.0 | 1.2 | 1.5 |
| F | 1.0 | 0.5 | 0.2 |
| Viscosity (Pa · s) | 0.4–0.5 | 0.3–0.5 | 0.3–0.5 |
| Cure Time (Minutes/C.) | 10/150 | 10/125 | 10/105 |
| Shelf Life (Months) | 6 | 5 | 3 |

None of the cured coating prepared using the compositions described in Table 1 could be peeled from the substrate using the adhesion test described in this example.

For purposes of comparison a coating was prepared using 92 parts of ingredient A, 6 parts of ingredient B, 0.2 part of ingredient C, 1.0 part of a 1/1 weight ratio mixture of ingredients D and E and 1.0 part of methylbutynol as the platinum catalyst inhibitor. Methylbutynol is not within the present scope of catalyst inhibitors. The storage stability of this composition was 2 to 3 days in a closed container under ambient conditions.

As a second comparative example a composition was prepared using the types and amounts of ingredients in sample 3 of table 1, with the exception that the concentration of the mixture of ingredients D and E was 2 parts per 100 parts of ingredient A. This composition was not cured following a 20 minute residence time in an oven maintained at a temperature of 120° C.

That which is claimed is:

1. In an improved one-part liquid organosiloxane composition curable by a platinum-catalyzed hydrosilylation reaction, the composition comprising A. at least one liquid polydiorganosiloxane containing an average of at least two alkenyl radicals per molecule.

B. as the curing agent, an organohydrogensiloxane containing an average of at least three silicon-bonded hydrogen atoms per molecule in an amount sufficient to cure said composition to an elastomer, C. an amount of a platinum-containing hydrosilylation catalyst sufficient to promote curing of said composition at a temperature of at least 80 degrees C., D. as the catalyst inhibitor, an amount of an acetylenic alcohol sufficient to suppress the activity of said catalyst at temperatures below about 40 degrees C., and E. as an adhesion promoter, an amount of at least one functionally substituted silane sufficient to achieve cohesive bonding between an material prepared by curing said composition and an inorganic substrate, the improvement consisting essentially of the presence in said composition of (1) an acetylenic alcohol containing at least 8 carbon atoms in an amount that imparts long term storage stability to the curable composition yet does not inhibit curing of said composition at temperatures below about 150 degrees, and (2) as said adhesion promoter, a mixture consisting essentially of (a) a polysiloxane containing at least one silicon-bonded vinyl radical and at least one silicon-bonded hydroxyl radical per molecule, and (b) an epoxy-substituted alkoxysilane, where the concentration of said adhesion promoter is from 0.5 to 5 percent by weight, based on the weight of said polydiorganosiloxane, and the weight ratio of said alkoxysilane to said polysiloxane is from 0.3 to 3 parts by weight of alkoxysilane per part of polysiloxane.

2. A composition according to claim 1 where the concentration of acetylenic alcohol is from 0.1 to 1.0 weight percent, based on the weight of the ethylenically unsaturated polydiorganosiloxane, and the weight of adhesion promoter is from about 1 to about 3 weight percent, based on the weight of said polydiorganosiloxane, and said weight ratio is from 0.5 to 1.5.

3. A composition according to claim 2 where said polydiorganosiloxane is represented by the general formula I $$\text{Vi}-[\text{SiO}]_n-\underset{\underset{R^1}{|}}{\overset{\overset{R^1}{|}}{\text{Si}}}-\text{Vi} \qquad (I)$$

where each $R^1$ is individually selected from the group consisting of monovalent hydrocarbon radicals and monovalent halohydrocarbon radicals and $R^1$ contains from 1 to 20 carbon atoms, Vi represents a vinyl radical, and n represents a degree of polymerization equivalent to a viscosity of from 1 to about 200 Pa·s at 25° C.

4. A composition according to claim 3 where at least 50 percent of the radicals represented by $R^1$ are methyl, and any remainder are selected from the group consisting of vinyl, phenyl and 3,3,3-trifluoropropyl, the curing agent is a linear trimethylsiloxy terminated dimethylsiloxane/methylhydrogensiloxane copolymer containing an average of from 10 to about 50 repeating units per molecule, of which from 3 to 5 are methylhydrogensiloxane, or a compound of the formula $\text{Si}(\text{OSiR}^4{}_2\text{H})_4$ where $R^4$ is lower alkyl, most preferably methyl, and the acetylenic alcohol contains 8 carbon atoms.

* * * * *